(12) United States Patent
Hasebe (10) Patent No.: US 11,028,750 B2
(45) Date of Patent: Jun. 8, 2021

(54) CONTROL DEVICE FOR INTERNAL COMBUSTION ENGINE

(71) Applicant: TOYOTA JIDOSHA KABUSHIKI KAISHA, Aichi-ken (JP)

(72) Inventor: Taro Hasebe, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 41 days.

(21) Appl. No.: 16/671,173

(22) Filed: Nov. 1, 2019

(65) Prior Publication Data
US 2020/0157993 A1 May 21, 2020

(30) Foreign Application Priority Data

Nov. 19, 2018 (JP) .............................. JP2018-216836

(51) Int. Cl.
*F01N 3/00* (2006.01)
*F01N 3/20* (2006.01)
(Continued)

(52) U.S. Cl.
CPC ........... *F01N 3/206* (2013.01); *B01D 53/945* (2013.01); *B01D 53/9486* (2013.01); *B01D 53/9495* (2013.01); *B01J 23/63* (2013.01); *B01J 35/04* (2013.01); *B01J 37/0228* (2013.01); *B60K 6/485* (2013.01); *F01N 3/0814* (2013.01); *F01N 3/0835* (2013.01); *F01N 3/101* (2013.01); *F01N 3/225* (2013.01); *F01N 3/32* (2013.01); *F02D 41/0235* (2013.01); *B01D 2255/1021* (2013.01);
(Continued)

(58) Field of Classification Search
CPC ........ F01N 3/206; F01N 3/101; F01N 3/0814; F01N 3/225; F01N 3/0835; F01N 3/32; F01N 2570/12; F02D 41/0235; F02D 2200/0802; B01D 53/9486; B01D 53/9495; B01D 53/945; B01D 2255/912
USPC .......................................................... 60/285
See application file for complete search history.

(56) References Cited

U.S. PATENT DOCUMENTS 4,098,079 A * 7/1978 Ueda ..................... F02D 19/023
60/290
5,376,610 A * 12/1994 Takahata ............. F01N 13/0097
502/66
(Continued)

FOREIGN PATENT DOCUMENTS

JP   2010-202137 A   9/2010

*Primary Examiner* — Jason D Shanske
(74) *Attorney, Agent, or Firm* — Hauptman Ham, LLP (57) ABSTRACT

An internal combustion engine includes an engine body, an HC adsorption and removal catalyst in an exhaust, including an HC adsorption layer and a catalyst layer, and having a desorption temperature of the HC from the HC adsorption layer lower than an HC removal temperature of a temperature where a rate of removal of HC at the catalyst layer is a predetermined rate or more when an air-fuel ratio of the exhaust is near the stoichiometric air-fuel ratio, and an air feed device for feeding air to the HC adsorption and removal catalyst. A control device for an internal combustion engine includes an air feed control for controlling feed air to the HC adsorption and removal catalyst when a condition stands. The condition includes the temperature of the HC adsorption and removal catalyst being the desorption temperature or more and less than the HC removal temperature.

6 Claims, 8 Drawing Sheets

(51) Int. Cl.

| | | |
|---|---|---|
| *F02D 41/02* | (2006.01) | |
| *F01N 3/10* | (2006.01) | |
| *F01N 3/08* | (2006.01) | |
| *B01D 53/94* | (2006.01) | |
| *F01N 3/22* | (2006.01) | |
| *B60K 6/485* | (2007.10) | |
| *B01J 35/04* | (2006.01) | |
| *B01J 23/63* | (2006.01) | |
| *B01J 37/02* | (2006.01) | |
| *F01N 3/32* | (2006.01) | |

(52) U.S. Cl.
CPC .. *B01D 2255/2065* (2013.01); *B01D 2255/50* (2013.01); *B01D 2255/912* (2013.01); *B60Y 2200/92* (2013.01); *F01N 2570/12* (2013.01); *F02D 2200/0802* (2013.01); *F02D 2200/503* (2013.01)

(56) References Cited

U.S. PATENT DOCUMENTS

| | | | | |
|---|---|---|---|---|
| 5,538,697 | A * | 7/1996 | Abe | B01J 35/04 422/171 |
| 5,603,215 | A * | 2/1997 | Sung | F01N 3/2006 60/274 |
| 6,000,217 | A * | 12/1999 | Hochmuth | F01N 3/2889 60/274 |
| 6,029,441 | A * | 2/2000 | Mizuno | F01N 3/2013 60/274 |
| 6,074,973 | A * | 6/2000 | Lampert | B01D 53/945 502/60 |
| 9,777,609 | B2 * | 10/2017 | Chandler | F01N 3/103 |
| 2011/0083426 | A1 * | 4/2011 | Ikemoto | F01P 7/165 60/286 |
| 2019/0353067 | A1 * | 11/2019 | Moser | B01J 23/464 |
| 2020/0080453 | A1 * | 3/2020 | Sakuma | F01N 3/101 |

* cited by examiner

CONTROL DEVICE FOR INTERNAL COMBUSTION ENGINE

RELATED APPLICATIONS

The present application claims priority of Japanese Patent Application No. 2018-216836, filed Nov. 19, 2018, the disclosure of which is hereby incorporated by reference herein in its entirety.

FIELD

The present disclosure relates to a control device for an internal combustion engine.

BACKGROUND

Japanese Unexamined Patent Publication No. 2010-202137 discloses improving the startup characteristics of an internal combustion engine by burning an air-fuel mixture of an air-fuel ratio richer than a stoichiometric air-fuel ratio after starting up the internal combustion engine until the internal combustion engine can be stably operated.

Further, Japanese Unexamined Patent Publication No. 2010-202137 discloses that unburned fuel is adsorbed on a three-way catalyst provided in an exhaust passage when burning an air-fuel mixture of an air-fuel ratio richer than the stoichiometric air-fuel ratio, so it is possible to use a motor to operate an internal combustion engine in a fuel cut state and thereby feed air to the three-way catalyst after stable operation of the internal combustion engine becomes possible so as to burn the unburned fuel adsorbed on the three-way catalyst.

SUMMARY

An HC (hydrocarbon) adsorption and removal catalyst provided with the function of adsorption of HC and the function of removing it has the characteristic of the desorption temperature at which HC adsorbed at the HC adsorption and removal catalyst is desorbed from the HC adsorption and removal catalyst being lower than the HC removal temperature at which the rate of removal of HC becomes a predetermined rate of removal at the HC adsorption and removal catalyst. For this reason, when the temperature of the HC adsorption and removal catalyst is in a temperature region from the desorption temperature to the HC removal temperature, there is the problem that the amount of HC discharged from the HC adsorption and removal catalyst increases and the exhaust emission temporarily deteriorates.

As opposed to this, the above-mentioned Japanese Unexamined Patent Publication No. 2010-202137 uses a motor to operate the internal combustion engine for sending to the three-way catalyst the amount of air enabling the amount of fuel made richer than the stoichiometric air-fuel ratio (amount of increase of fuel) to be burned when the engine becomes a state enabling stable operation after startup of the internal combustion engine. It could not solve the problem of the increase of the amount of discharge of HC from the HC adsorption and removal catalyst and temporary deterioration of the exhaust emissions when the temperature of the HC adsorption and removal catalyst is in a temperature region from the desorption temperature to the HC removal temperature.

The present disclosure was made focusing on such a problem and has as its object to keep exhaust emissions from deteriorating when the temperature of the HC adsorption and removal catalyst is in a temperature region from the desorption temperature to the HC removal temperature.

To solve this problem, according to one aspect of the present disclosure, an internal combustion engine comprises an engine body, an HC adsorption and removal catalyst provided in an exhaust passage of the engine body, including an HC adsorbent adsorbing hydrocarbons in the exhaust and a catalyst removing the hydrocarbons, and having a desorption temperature of the hydrocarbons from the HC adsorbent lower than an I-IC removal temperature of a temperature where a rate of removal of hydrocarbons at the catalyst is a predetermined rate or more when an air-fuel ratio of the exhaust is in a region near the stoichiometric air-fuel ratio, and an air feed device for feeding air to the HC adsorption and removal catalyst. Further, the control device for the internal combustion engine comprises an air feed control part configured to control the air feed device to feed air to the HC adsorption and removal catalyst when a predetermined condition stands. The predetermined condition is made the temperature of the HC adsorption and removal catalyst being the desorption temperature or more and less than the HC removal temperature.

According to this aspect of the present disclosure, it is possible to keep exhaust emissions from deteriorating when the temperature of the HC adsorption and removal catalyst is in a temperature region from the desorption temperature to the HC removal temperature.

DESCRIPTION OF EMBODIMENTS

Below, referring to the drawings, embodiments of the present disclosure will be explained in detail. Note that, in the following description, similar component elements are assigned the same reference signs.

First Embodiment

Figure 1:
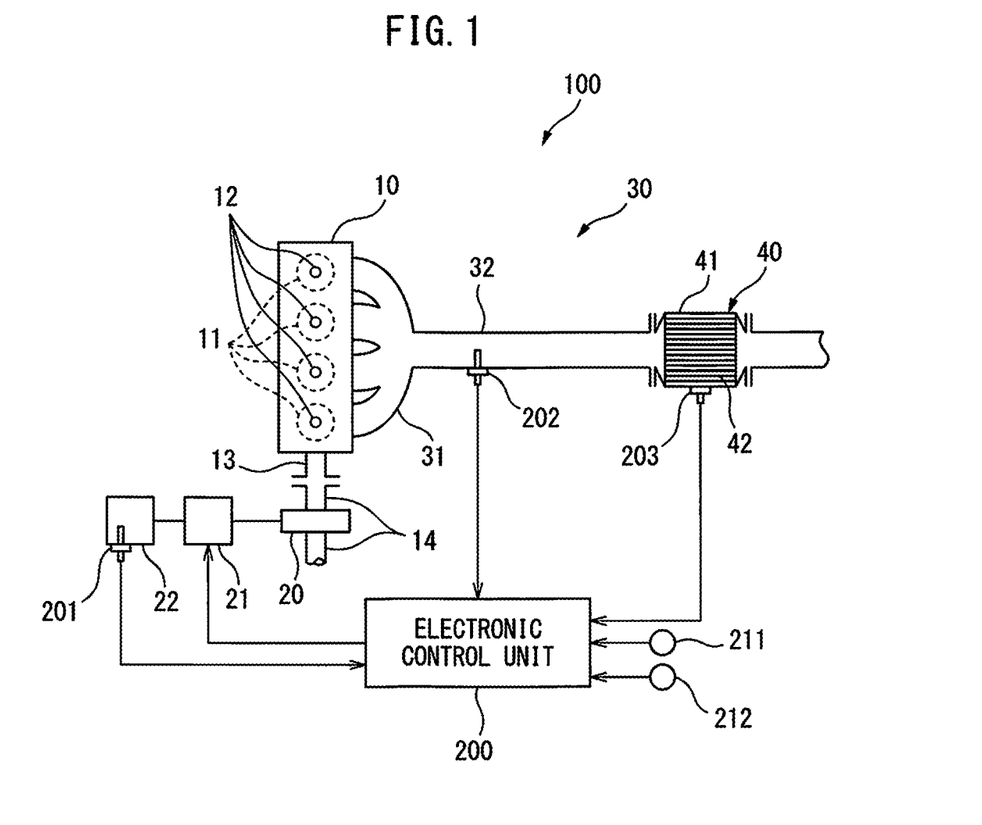
FIG. 1 is a schematic view of the configurations of an internal combustion engine and an electronic control unit for controlling the internal combustion engine according to a first embodiment of the present disclosure.

FIG. 1 is a schematic view of the configurations of an internal combustion engine 100 and an electronic control unit 200 for controlling the internal combustion engine 100 according to a first embodiment of the present disclosure.

The internal combustion engine 100 according to the present embodiment is provided with an engine body 10 provided with a plurality of cylinders 11, a motor-generator 20, and an exhaust system 30.

The engine body 10 is a gasoline engine which burns fuel injected from fuel injectors 12 at the insides of the cylinders 11 so as to generate the power for making an output shaft 14 connected to a crankshaft 13 rotate. Note that, in FIG. 1, to prevent complication of the drawings, illustration of the intake system, spark plugs, etc. is omitted. Further, in FIG. 1, a so-called direct injection type of internal combustion engine 100 is illustrated, but the engine may also be a port injection type of internal combustion engine.

The motor-generator 20 is provided at the output shaft 14 and is electrically connected to a battery 22 through a power control unit 21 including an inverter and converter. The battery 22 is provided with an SOC sensor 201 for detecting a state of charge SOC of the battery.

In the present embodiment, the electronic control unit 200 can be used to control the power control unit 21 to make the motor-generator 20 function as a motor and thereby use the power of the motor-generator 20 to make the output shaft 14 and in turn the crankshaft 13 rotate. Further, the electronic control unit 200 can be used to control the power control unit 21 to make the motor-generator 20 function as a generator and thereby convert the power of the engine body 10 to electric power to charge the battery 22.

The exhaust system 30 is provided with an exhaust manifold 31, exhaust pipe 32, and exhaust after treatment system 40.

The exhaust generated at the cylinders 11 of the engine body 10 is collected by the exhaust manifold 31 and discharged into the exhaust pipe 32. The exhaust contains unburned gases (carbon monoxide (CO) and hydrocarbons (HC)) and nitrogen oxides (NOx) and other harmful substances. For this reason, the exhaust pipe 32 is provided with the exhaust after treatment system 40 for removing these harmful substances in the exhaust. At the exhaust pipe 32 at the upstream side from the exhaust after treatment system 40 in the direction of flow of exhaust, an air-fuel ratio sensor 202 for detecting an air-fuel ratio of the exhaust is attached.

The exhaust after treatment system 40 according to the present embodiment is provided with a casing 41, an HC adsorption and removal catalyst 42 held in the casing 41, and a catalyst temperature sensor 203 attached to the casing 41 and detecting a temperature of the HC adsorption and removal catalyst 42 (below, referred to as the "catalyst temperature"). Details of the HC adsorption and removal catalyst 42 will be explained later.

The electronic control unit 200 is a microcomputer provided with components connected with each other by a bidirectional bus such as a central processing unit (CPU), read only memory (ROM), random access memory (RAM), input port, and output port.

The electronic control unit 200 receives as input the output signals from not only the above-mentioned SOC sensor 201, air-fuel ratio sensor 202 and catalyst temperature sensor 203, but also a load sensor 211 generating an output voltage proportional to an amount of depression of an accelerator pedal (not shown) corresponding to a load of the engine body 10 (engine load), a crank angle sensor 212 generating an output pulse each time the crankshaft 13 of the engine body 10 rotates by for example 15° as a signal for calculating the engine speed, and various other sensors.

Further, the electronic control unit 200 controls the fuel injectors 12, power control unit 21, etc. to control the internal combustion engine 100 based on the output signals of the various sensors which were input. For example, the electronic control unit 200 controls the injection amounts of the fuel injectors 12 so that the air-fuel ratio of the exhaust detected by the air-fuel ratio sensor 202 becomes the target air-fuel ratio (basically, the air-fuel ratio in the region near the stoichiometric air-fuel ratio explained later).

Below, details of the HC adsorption and removal catalyst 42 will be explained.

Figure 2A:
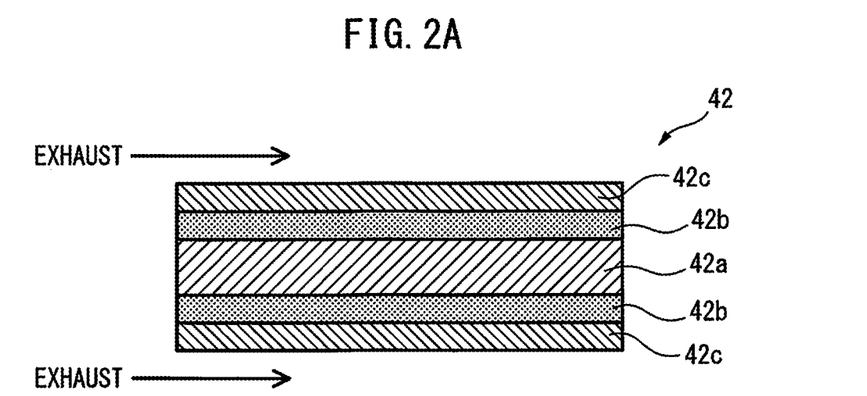
FIG. 2A is a partial cross-sectional view of an HC adsorption and removal catalyst according to the first embodiment of the present disclosure.
Figure 2B:
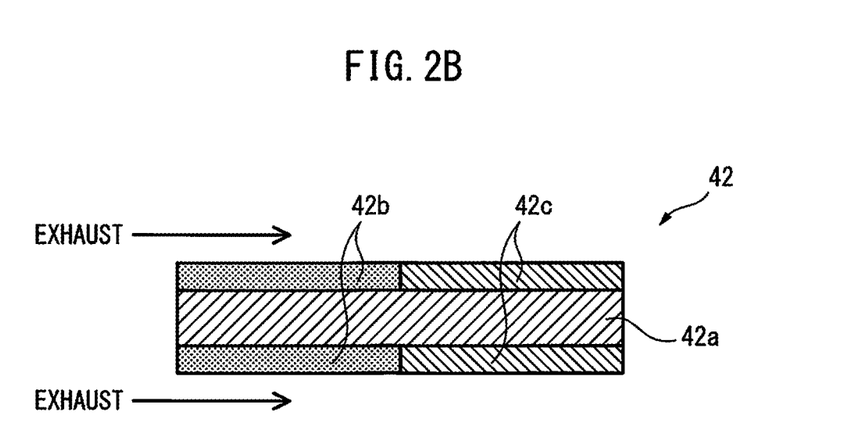
FIG. 2B is a partial cross-sectional view of an HC adsorption and removal catalyst according to a modification of the present disclosure.

The HC adsorption and removal catalyst 42 is, for example, a honeycomb shaped support made of cordierite (ceramic) on which an HC adsorbent and three-way catalyst are supported. The HC adsorption and removal catalyst 42 according to the present embodiment, as shown in the partial cross-sectional view of the HC adsorption and removal catalyst 42 shown in FIG. 2A, is structured as a honeycomb shaped support 42a on the surface of which an HC adsorbent (for example, zeolite) is coated to form an HC adsorption layer 42b and on the surface (top surface) of the HC adsorption layer 42b of which are coated a three-way catalyst containing a precious metal having a catalytic action (for example platinum (Pt)) and a co-catalyst having an oxygen storage ability (for example ceria ($CeO_2$)) to form a catalyst layer 42c. However, the structure of the HC adsorption and removal catalyst 42 is not limited to such a structure. For example, as shown in the partial cross-sectional view of the HC adsorption and removal catalyst 42 according to a modification of the present embodiment shown in FIG. 2B, it is also possible to form an HC adsorption layer 42b on the upstream side surface of the honeycomb shaped support 42a in the direction of flow of exhaust and a catalyst layer 42c on the downstream side surface in the direction of flow of exhaust.

The HC adsorbent (HC adsorption layer 42b) adsorbs the HC in the exhaust flowing into the casing 41 when the catalyst temperature is in a temperature region less than a predetermined desorption temperature. Further, the HC adsorbent allows the adsorbed HC to be desorbed when the catalyst temperature is in a temperature region of the desorption temperature or more. Note that in the HC adsorbent, basically adsorption and desorption of HC proceed simultaneously. The desorption temperature is the temperature at which the desorption speed of HC (amount of HC per unit time and unit area desorbed from the HC adsorbent) becomes faster than the adsorption speed of HC (amount of HC per unit time and unit area adsorbed by the HC adsorbent). The desorption temperature in the HC adsorption layer 42b of the HC adsorption and removal catalyst 42 according to the present embodiment is generally 150° C.

Figure 3:
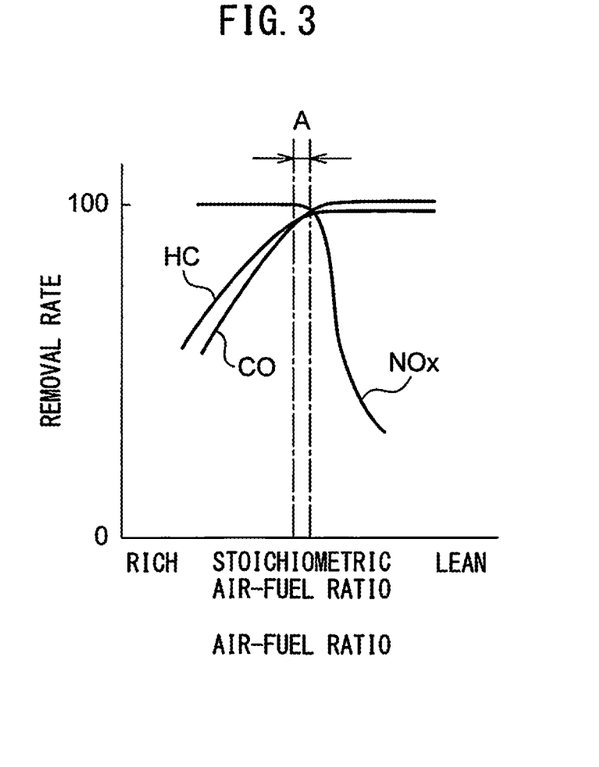
FIG. 3 is a view showing purification characteristic of a three-way catalyst.

The three-way catalyst (catalyst layer 42c) simultaneously removes the unburned gases (CO and HC) and NOx. FIG. 3 is a view showing the removal characteristic of a three-way catalyst. As shown in FIG. 3, the rate of removal of unburned gases (CO and HC) and NOx by the three-way catalyst becomes higher when the air-fuel ratio of the exhaust flowing into the casing 41 is in the region near the stoichiometric air-fuel ratio (removal window A in FIG. 3).

However, in order for the three-way catalyst to exhibit the catalytic action of simultaneously removing the unburned gases (CO and HC) and NOx, the catalyst temperature must become a certain constant temperature or more. Here, if referring to the catalyst temperature at which HC can be removed by a predetermined rate of removal in the three-way catalyst (in the present embodiment, 50%) as the "HC removal temperature", the HC removal temperature when exhaust in the region near the stoichiometric air-fuel ratio flows into the casing 41 becomes higher than the desorption temperature.

That is, the HC adsorption and removal catalyst 42 has the characteristic of the temperature of desorption of HC from HC adsorption layer 42b being lower than the HC removal temperature at the catalyst layer 42c. For this reason, when the catalyst temperature is in the temperature region from the desorption temperature to the HC removal temperature (below, referred to as the "non-HC removal temperature region"), the HC desorbed from the HC adsorption layer 42b cannot be removed at the catalyst layer 42c and as a result HC ends up being discharged to the outside air and there is the problem that the exhaust emissions temporarily deteriorate.

Therefore, the inventors engaged in intensive research whereupon they learned that by raising the content of oxygen in the gas flowing into the casing 41 (below, referred to as the "inflowing gas"), it is possible to lower the HC removal temperature. Further, by making the content of oxygen in the inflowing gas generally equal to the air, that is, 20%, it is possible to make the HC removal temperature fall to a temperature equal to the desorption temperature. This is believed to be because by raising the content of oxygen in the inflowing gas, the HC desorbed from the HC adsorption layer 42b is removed by reacting with the oxygen ($O_2$) in the inflowing gas.

Figure 4:
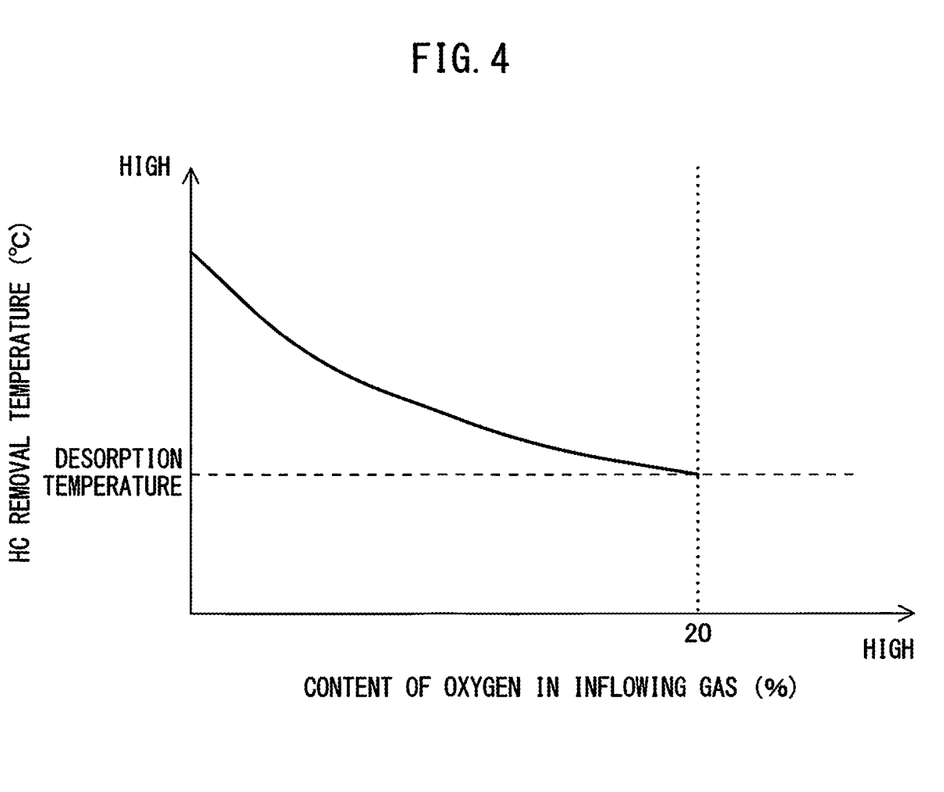
FIG. 4 is a view showing a relationship of a content of oxygen in inflowing gas and an HC removal temperature.

FIG. 4 is a view showing the relationship of the content of oxygen in the inflowing gas and the HC removal temperature. As shown in FIG. 4, it is learned that by raising the content of oxygen in the inflowing gas, it is possible to lower the HC removal temperature and that by making the content of oxygen in the inflowing gas generally equal to the air, that is, 20%, it is possible to lower the HC removal temperature to a temperature equal to the desorption temperature.

Therefore, in the present embodiment, when the catalyst temperature is in the non-HC removal temperature region, air is introduced into the casing 41. Specifically, in the present embodiment, the fuel injection from the fuel injectors 12 is stopped and in that state the motor-generator 20 is used for operating the engine body 10 for motoring and thereby introducing air into the casing 41.

Due to this, it is possible to lower the HC removal temperature down to a temperature equal to the desorption temperature, so when the catalyst temperature rises to the desorption temperature and HC starts to be desorbed from the HC adsorption layer 42b, the HC desorbed from the HC adsorption layer 42b can be removed by being made to react with oxygen. For this reason, when the catalyst temperature is in the non-HC removal temperature region, the HC can be kept from ending up being discharged to the outside air without being removed by the HC adsorption and removal catalyst.

Note that in the following explanation, for convenience, the HC removal temperature when exhaust in the region near the stoichiometric air-fuel ratio flows into the casing 41 will be referred to as the "normal HC removal temperature" in accordance with need. On the other hand, the HC removal temperature when stopping fuel injection from the fuel injectors 12 and in that state using the motor to operate the engine body 10 to introduce air to the casing 41 will be referred to as the "air feed HC removal temperature". The normal HC removal temperature is a temperature higher than the air feed HC removal temperature. The normal HC removal temperature of the HC adsorption and removal catalyst 42 according to the present embodiment is generally 300° C.

Below, the air feed control for removal of HC according to the present embodiment will be explained.

Figure 5:
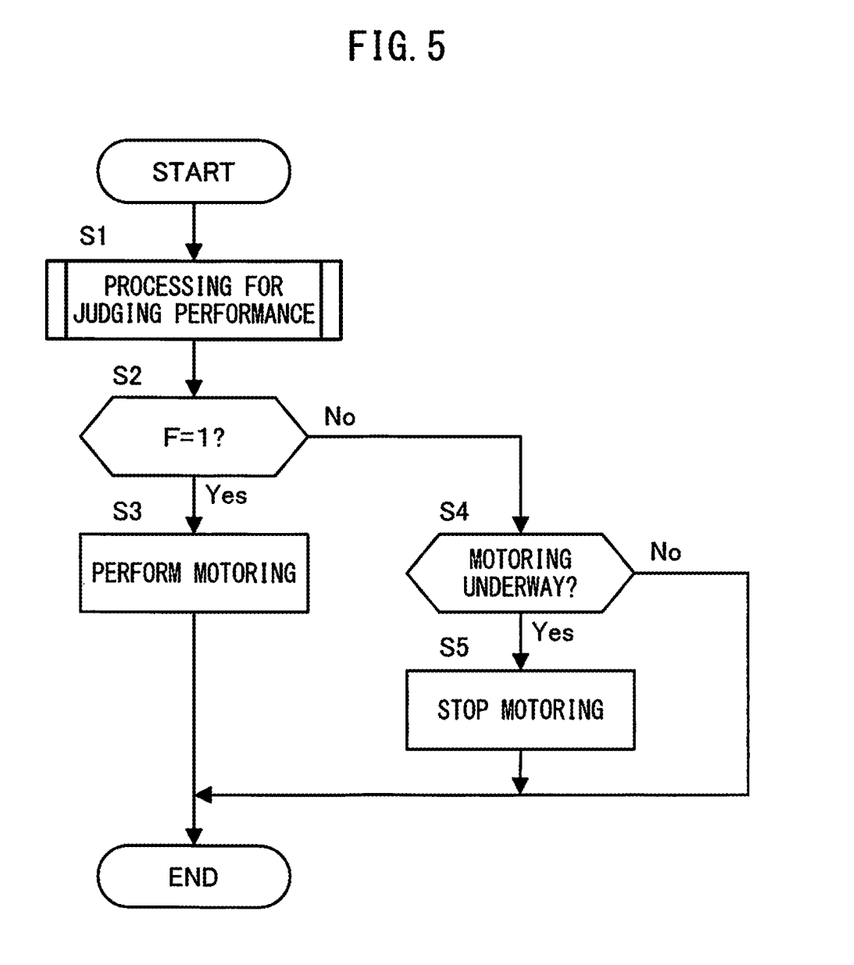
FIG. 5 is a flow chart explaining HC removal control according to the first embodiment of the present disclosure.

FIG. 5 is a flow chart explaining air feed control according to the present embodiment performed by the electronic control unit 200. The electronic control unit 200 repeatedly performs the present routine by a predetermined processing cycle during engine operation.

At step S1, the electronic control unit 200 performs processing for judging performance for whether to perform air feed control for removal of HC. Details of the processing for judging performance for air feed control will be explained later with reference to FIG. 5.

At step S2, the electronic control unit 200 judges if the performance permission flag F of air feed control is set to "1". The performance permission flag F is a flag which is set to "1" when performance of air feed control is permitted in the processing for judging performance of air feed control. The initial value is set to "0". If the performance permission flag F is set to "1", the electronic control unit 200 proceeds to the processing of step S3. On the other hand, if the performance permission flag F is set to "0", the electronic control unit 200 proceeds to the processing of step S4.

At step S3, the electronic control unit 200 stops the fuel injection from the fuel injectors 12 and controls the power control unit 21 to make the motor-generator 20 function as a motor so as to operate the engine body 10. At this time, the electronic control unit 200 controls the output torque of the motor-generator 20 so as to become the demanded torque corresponding to the engine load.

At step S4, the electronic control unit 200 judges if the motor is being used to operate the engine. If the motor is being used to operate the engine, the electronic control unit 200 proceeds to the processing of step S5. On the other hand, if the motor is not being used to operate the engine, the electronic control unit 200 ends the current processing.

At step S5, the electronic control unit 200 stops the motor being used to operate the engine and resumes the fuel injection from the fuel injectors 12 to operate the engine body 10.

Figure 6:
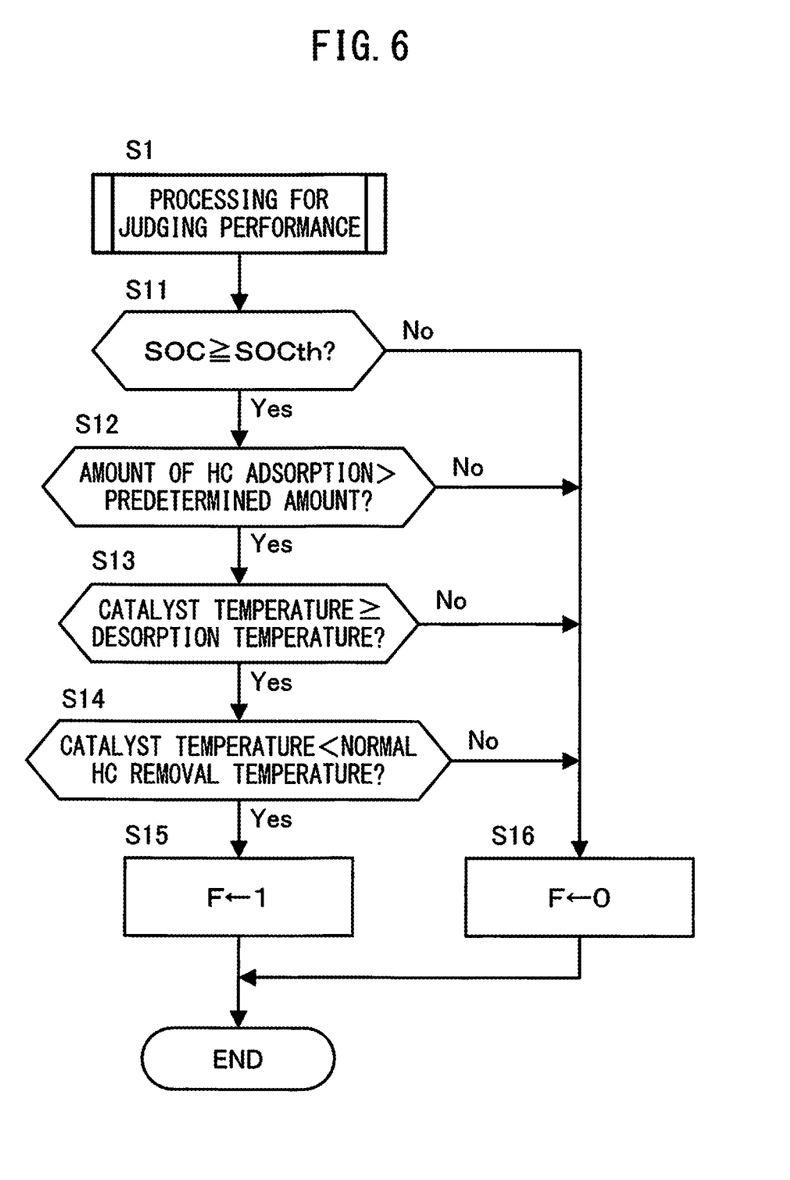
FIG. 6 is a flow chart explaining details of processing for judging performance of HC removal control according to the first embodiment of the present disclosure.

FIG. 6 is a flow chart explaining details of processing for judging performance of air feed control.

At step S11, the electronic control unit 200 judges if the battery state of charge SOC is a predetermined allowable state of charge SOCth or more. The electronic control unit 200 proceeds to the processing of step S12 if the battery state of charge SOC is the allowable state of charge SOCth or more. On the other hand, the electronic control unit 200 proceeds to the processing of step S16 if the battery state of charge SOC is less than the allowable state of charge SOCth.

In the present embodiment, due to the motor-generator 20 being used to operate the engine body 10, air is introduced into the casing 41, so during use of the motor to operate the engine, the battery state of charge falls. For this reason, the allowable state of charge SOCth is, for example, set to a state of charge whereby the battery state of charge SOC will not become less than a predetermined lower limit state of charge during use of the motor to operate the engine. The lower limit state of charge is, for example, a state of charge where if the battery state of charge falls below the lower limit state of charge, the supply of electric power to other electrical equipment to which the electric power of the battery 22 is supplied is liable to be hindered.

In this way, by judging, as a condition for performance of air feed control, if the battery state of charge SOC is the allowable state of charge SOCth or more, it is possible to continuously perform use the motor to operate the engine without affecting other electrical equipment.

At step S12, the electronic control unit 200 reads in the amount of HC adsorbed at the HC adsorption layer 42b of the HC adsorption and removal catalyst 42 calculated at any time during engine operation separately from the present routine (below, referred to as the "amount of HC adsorption") and judges if the amount of HC adsorption is larger than a predetermined amount (in the present embodiment, 0). If the amount of HC adsorption is greater than the predetermined amount, the electronic control unit 200 proceeds to the processing of step S13. On the other hand, if the amount of HC adsorption is the predetermined amount or less, the electronic control unit 200 proceeds to the processing of step S16.

In this way, by judging, as a condition for performance of air feed control, if the amount of HC adsorption is greater than a predetermined amount, it is possible to keep the motor from being unnecessarily used to operate the engine and keep electric power from ending up being consumed.

Note that the method of calculation of the amount of adsorption of HC is not particularly limited, but for example the amount can be calculated as explained below. That is, the amount of HC per unit time flowing into the casing 41 can, for example, be calculated based on the engine operating state (engine load and engine speed) and air-fuel ratio of the exhaust by referring to a map found in advance by experiments. Further, the amount of HC per unit time desorbed from the HC adsorption layer 42b can, for example, be calculated based on the catalyst temperature by referring to the map found in advance by experiments. Therefore, by cumulatively adding the amount of HC per unit time flowing into the casing 41 and the amount of HC per unit time desorbed from the HC adsorption layer 42b which are found in this way, it is possible to calculate the amount of HC adsorption.

At step S13, the electronic control unit 200 judges if the catalyst temperature is the desorption temperature or more. If the catalyst temperature is the desorption temperature or more, the electronic control unit 200 proceeds to the processing of step S14. On the other hand, if the catalyst temperature is less than the desorption temperature, the electronic control unit 200 proceeds to the processing of step S16 since it is possible to make HC be adsorbed at the HC adsorption layer 42b of the HC adsorption and removal catalyst 42.

At step S14, the electronic control unit 200 judges if the catalyst temperature is less than the normal HC removal temperature. If the catalyst temperature is less than the normal HC removal temperature, the electronic control unit 200 proceeds to the processing of step S15. On the other hand, if the catalyst temperature is the normal HC removal temperature or more, the electronic control unit 200 proceeds to the processing of step S16 since the HC can be removed at the catalyst layer 42c of the HC adsorption and removal catalyst 42 without air being fed.

At step S15, the electronic control unit 200 sets the performance permission flag F to "1".

At step S16, the electronic control unit 200 sets the performance permission flag F to "0".

The internal combustion engine 100 according to the present embodiment explained above is provided with an engine body 10, an HC adsorption and removal catalyst 42 provided in an exhaust pipe 32 (exhaust passage) of the engine body 10, including an HC adsorption layer 42b adsorbing HC in the exhaust and a catalyst layer 42c removing the HC, and having a desorption temperature of the HC from the HC adsorption layer 42b lower than a normal HC removal temperature (HC removal temperature) of a temperature where a rate of removal of HC at the catalyst layer 42c is a predetermined rate or more when an air-fuel ratio of the exhaust is in a region near the stoichiometric air-fuel ratio, and an air feed device for feeding air to the HC adsorption and removal catalyst 42. Further, an electronic control unit 200 (control device) controlling the internal combustion engine 100 is provided with an air feed control part configured to control the air feed device to feed air to the HC adsorption and removal catalyst 42 when a predetermined condition stands. The predetermined condition is made the temperature of the HC adsorption and removal catalyst 42 being the desorption temperature or more and less than the normal HC removal temperature.

In this way, when the temperature of the HC adsorption and removal catalyst 42 is in the non-HC removal temperature region from the desorption temperature to the normal HC removal temperature, it is possible to feed air to the HC adsorption and removal catalyst 42 to make the temperature at which the rate of removal of HC becomes a predetermined rate or more fall to a temperature equal to the desorption temperature.

That is, when the temperature of the HC adsorption and removal catalyst 42 rises to the desorption temperature and desorption of HC from the HC adsorption layer 42b starts, the HC desorbed from the HC adsorption layer 42b can be made to react with the oxygen in the air and be removed. For this reason, when the temperature of the HC adsorption and removal catalyst 42 is in the non-HC removal temperature region, it is possible to keep the HC from ending up being discharged to the outside air without being removed by the HC adsorption and removal catalyst 42. Therefore, it is possible to keep the exhaust emission from deteriorating when the temperature of the HC adsorption and removal catalyst 42 is in the non-HC removal temperature region from the desorption temperature to the normal HC removal temperature. Further, due to the heat of reaction when the HC desorbed from the HC adsorption layer 42b and the oxygen in the air react, it is possible to make the temperature of the HC adsorption and removal catalyst 42 rise to the normal HC removal temperature at an early stage.

Note that, in the present embodiment, the air feed device is a motor-generator 20 (motor) able to make the crankshaft 13 of the engine body 10 rotate. Further, more specifically, the air feed control part is configured to make the crankshaft 13 rotate by the motor-generator 20 without making fuel burn in the engine body 10 so as to discharge air taken into the engine body 10 from the engine body 10 to the exhaust pipe 32 and feed it to the HC adsorption and removal catalyst 42.

In this case, it is preferable to further add to the predetermined condition the state of charge SOC of the battery 22 supplying electric power to the motor-generator 20 (motor) being an allowable state of charge SOCth (predetermined amount) or more. Due to this, it is possible to continue using the motor to operate the engine without affecting the other electrical equipment to which electric power of the battery 22 is supplied.

Further, in the present embodiment, the amount of adsorption of HC adsorbed at the HC adsorption layer 42b being greater than a predetermined amount is further added to the predetermined condition. Due to this, it is possible to inhibit unnecessarily controlling the air feed device and ending up feeding air to the HC adsorption and removal catalyst 42 even when the amount of adsorption of HC is small. In particular, if, like in the present embodiment, using the electric power of the battery 22 to operate the engine and thereby feed air to the HC adsorption and removal catalyst 42, it is possible to inhibit unnecessarily using the motor to operate the engine and ending up consuming electric power.

Second Embodiment

Figure 7:
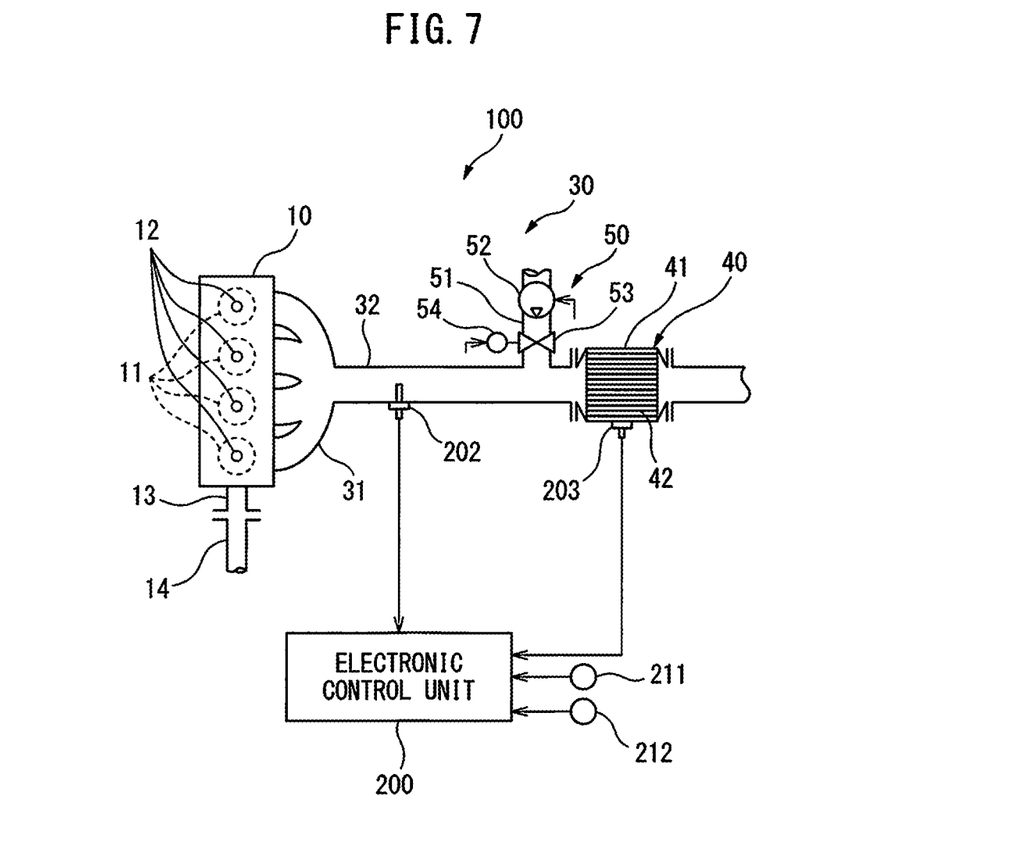
FIG. 7 is a schematic view of the configurations of an internal combustion engine and an electronic control unit for controlling the internal combustion engine according to a second embodiment of the present disclosure.

Next, a second embodiment of the present disclosure will be explained. The present embodiment differs from the first embodiment on the point of providing a secondary air feed device 50 as an air feed device for introducing air to the casing 41. Below, this point of difference will be focused on in the explanation.

FIG. 7 is a schematic view of the configurations of an internal combustion engine 100 and an electronic control unit 200 for controlling the internal combustion engine 100 according to the present embodiment.

As shown in FIG. 7, the internal combustion engine 100 according to the present embodiment is provided with a secondary air feed device 50 as an air feed device for introducing air to the casing 41.

The secondary air feed device 50 is a device for feeding secondary air to the exhaust pipe 32 at the upstream side from the exhaust after treatment system 40 in the direction of flow of exhaust and introducing secondary air to the casing 41 and is provided with a secondary air feed pipe 51, secondary air feed pump 52, secondary air feed valve 53, and actuator 54 for driving operation of the secondary air feed valve 53.

The secondary air feed pipe 51 is connected to the exhaust pipe 32 at the upstream side from the exhaust after treatment system 40 in the direction of flow of exhaust.

The secondary air feed pump 52 is provided at the secondary air feed pipe 51. The secondary air feed pump 52 is controlled by the electronic control unit 200 and pumps secondary air through the secondary air feed pipe 51 to the exhaust pipe 32 at the upstream side from the exhaust after treatment system 40 in the direction of flow of exhaust.

The secondary air feed valve 53 is an ordinarily closed valve and is provided at the secondary air feed pipe 51 at the downstream side of the secondary air feed pump 52 in the direction of flow of secondary air. The secondary air feed valve 53 is opened when secondary air should be introduced to the casing 41.

The actuator 54 is controlled by the electronic control unit 200 and drives the secondary air feed valve 53 to the open side when introducing secondary air to the casing 41.

Figure 8:
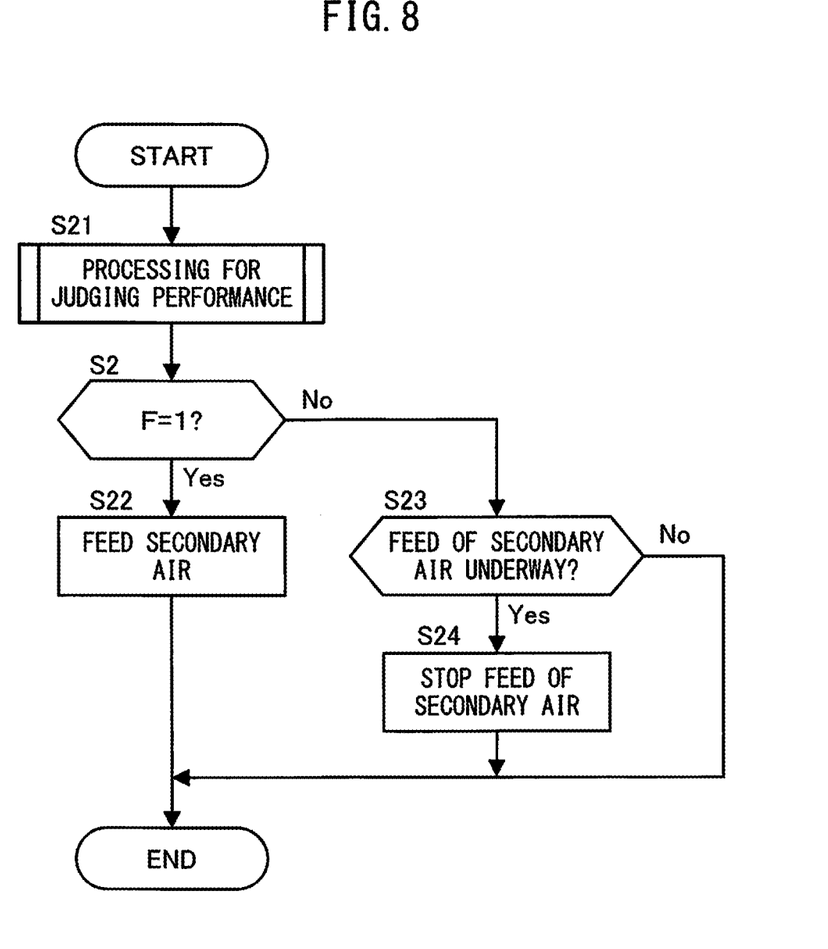
FIG. 8 is a flow chart explaining HC removal control according to the second embodiment of the present disclosure.

FIG. 8 is a flow chart explaining air feed control according to the present embodiment performed by the electronic control unit 200. The electronic control unit 200 repeatedly performs the present routine at predetermined processing cycles during engine operation. Note that in FIG. 8, at step S2, processing similar to the first embodiment is performed, so here the explanation will be omitted.

At step S21, the electronic control unit 200 performs processing for judging performance of the air feed control. The content of the processing for judging performance of the air feed control according to the present embodiment basically can be made content similar to the processing for judging performance of the air feed control according to the first embodiment explained above with reference to FIG. 5. However, compared with the amount of power required for using the motor to operate the engine, the electric power required for driving the secondary air feed pump 52 is small, so, for example, the processing of step S11 of FIG. 5 may be omitted.

At step S22, the electronic control unit 200 drives the secondary air feed pump 52 and opens the secondary air feed valve 53 to feed secondary air to the exhaust pipe 32 and feed the secondary air together with the exhaust to the inside of the casing 41. At this time, the electronic control unit 200 controls the secondary air feed pump 52 so that the higher the engine load (that is, the greater the flow rate of intake air and in turn the flow rate of exhaust), the greater the flow rate of secondary air discharged from the secondary air feed pump 52.

By doing this as well, in the same way as the first embodiment, it is possible to raise the content of oxygen in the inflow gas flowing into the casing 41, so when lowering the HC removal temperature and the catalyst temperature rises to the desorption temperature where HC starts to be desorbed from the HC adsorption layer 42b, it is possible to make the HC desorbed from the HC adsorption layer 42b react with oxygen to remove it. For this reason, when the catalyst temperature is in the non-HC removal temperature region, the HC is kept from ending up being discharged to the outside air without being removed by the HC adsorption and removal catalyst.

At step S23, the electronic control unit 200 judges if secondary air is being fed. The electronic control unit 200 proceeds to the processing of step S24 if secondary air is being fed. On the other hand, the electronic control unit 200 ends the current processing if secondary air is not being fed.

At step S24, the electronic control unit 200 stops the feed of secondary air. Specifically, the electronic control unit 200 stops the driving of the secondary air feed pump 52 and closes the secondary air feed valve 53.

In the present embodiment explained above, in the same way as the first embodiment, the internal combustion engine 100 includes an engine body 10, an HC adsorption and removal catalyst 42 provided in an exhaust pipe 32 (exhaust passage) of the engine body 10, including an HC adsorption layer 42b adsorbing HC in the exhaust and a catalyst layer 42c removing the HC, and having a desorption temperature of the HC from the HC adsorption layer 42b lower than an normal HC removal temperature (HC removal temperature) of a temperature where a rate of removal of HC at the catalyst layer 42c is a predetermined rate or more when an air-fuel ratio of the exhaust is in a region near the stoichiometric air-fuel ratio, and an air feed device for feeding air to the HC adsorption and removal catalyst 42. Further, an electronic control unit 200 (control device) controlling the internal combustion engine 100 is provided with an air feed control part configured to control the air feed device to feed air to the HC adsorption and removal catalyst 42 when a predetermined condition stands. The predetermined condition is made the temperature of the HC adsorption and removal catalyst 42 being the desorption temperature or more and less than the normal HC removal temperature.

Further, in the present embodiment, the air feed device is a secondary air feed device 50 provided with a secondary air feed passage 51 connected to an exhaust pipe 32 at the upstream side from the HC adsorption and removal catalyst 42 in the direction of flow of exhaust and the secondary air feed pump 52 provided at the secondary air feed passage 51. The air feed control part is configured to drive the secondary air feed pump 52 so as to feed the air discharged from the secondary air feed pump 52 through the secondary air feed passage 51 to the HC adsorption and removal catalyst 42.

By doing this as well, in the same way as the first embodiment, it is possible to raise the content of oxygen in the inflowing gas flowing into the casing 41, so when lowering the HC removal temperature so that the catalyst temperature rises to the desorption temperature and HC starts to be desorbed from the HC adsorption layer 42b, it is possible to make the HC desorbed from the HC adsorption layer 42b react with oxygen and remove it. For this reason, when the catalyst temperature is in a non-HC removal temperature region, it is possible to keep the HC from ending up being discharged to the outside air without being removed by the HC adsorption and removal catalyst.

Above, embodiments of the present disclosure were explained, but the above embodiments only show part of the examples of application of the present disclosure. It is not intended to limit the technical scope of the present disclosure to the specific configurations of the above embodiments.

For example, in the above embodiments, the catalyst temperature was directly detected by a catalyst temperature sensor 203 attached to the casing 41, but the method of detection of the catalyst temperature is not limited to this. For example, it is also possible to attach gas temperature sensors at the front and rear of the casing 41 and use the average value of the gas temperatures detected by the two gas temperature sensors as the catalyst temperature. Further, it is also possible to attach a gas temperature sensor to either of the front and rear of the casing 41 and estimate the catalyst temperature based on the detected value of the gas temperature sensor. Furthermore, it is also possible to not attach a catalyst temperature sensor or gas temperature sensor and estimate the catalyst temperature based on the engine operating state.

Further, in the above embodiments, when the catalyst temperature was the normal HC removal temperature or more, the feed of intake air was stopped, but it is also possible to continue the air feed until becoming a temperature higher by a certain degree from the normal HC removal temperature.

Further, in the above embodiments, it is also possible to provide a separate exhaust after treatment system holding a three-way catalyst inside of a casing for example at the exhaust pipe 32 at the upstream side from the exhaust after treatment system 40 in the direction of flow of exhaust.

The invention claimed is:

1. A control device for an internal combustion engine, the internal combustion engine comprising:
    an engine body;
    an HC adsorption and removal catalyst provided in an exhaust passage of the engine body, including an HC adsorption layer adsorbing HC in the exhaust and a catalyst layer removing the HC, and having a desorption temperature of the HC from the HC adsorption layer lower than an HC removal temperature of a temperature where a rate of removal of HC at the catalyst layer is a predetermined rate or more when an air-fuel ratio of the exhaust is in a region near the stoichiometric air-fuel ratio; and
    an air feed device for feeding air to the HC adsorption and removal catalyst, wherein
    the control device comprises an air feed control part configured to control the air feed device to feed air to the HC adsorption and removal catalyst when a predetermined condition stands,
    the predetermined condition being the temperature of the HC adsorption and removal catalyst being the desorption temperature or more and less than the HC removal temperature.

2. The control device for the internal combustion engine according to claim 1, wherein
    the air feed device is a motor able to make the crankshaft of the engine body rotate, and
    the air feed control part is further configured so as to make the crankshaft rotate by the motor without making the fuel burn at the engine body so as to discharge air taken into the engine body from the engine body to the exhaust passage and feed it to the HC adsorption and removal catalyst.

3. The control device for the internal combustion engine according to claim 2, further including as the predetermined condition, the state of charge of the battery supplying electric power to the motor being a predetermined amount or more.

4. The control device for the internal combustion engine according to claim 1, wherein
    the air feed device is a secondary air feed device comprising:
        a secondary air feed passage connected to the exhaust passage at the upstream side of the HC adsorption and removal catalyst in the direction of flow of exhaust; and
        a secondary air feed pump provided at the secondary air feed passage, and
    the air feed control part is further configured to drive the secondary air feed pump to thereby feed the air discharged from the secondary air feed pump through the secondary air feed passage to the HC adsorption and removal catalyst.

5. The control device for the internal combustion engine according to claim 1, further including as the predetermined condition, the amount of adsorption of HC adsorbed at the HC adsorption layer being greater than a predetermined amount.

6. The control device for the internal combustion engine according to claim 1, wherein the desorption temperature is 150° C.

* * * * *